United States Patent
Huibers et al.

(10) Patent No.: US 7,436,572 B2
(45) Date of Patent: Oct. 14, 2008

(54) MICROMIRRORS AND HINGE STRUCTURES FOR MICROMIRROR ARRAYS IN PROJECTION DISPLAYS

(75) Inventors: Andrew Huibers, Palo Alto, CA (US); Satyadev Patel, Sunnyvale, CA (US)

(73) Assignee: Texas Instruments Incorporated, Dallas, TX (US)

( * ) Notice: Subject to any disclaimer, the term of this patent is extended or adjusted under 35 U.S.C. 154(b) by 359 days.

(21) Appl. No.: 10/927,408

(22) Filed: Aug. 25, 2004

(65) Prior Publication Data

US 2006/0044519 A1    Mar. 2, 2006

(51) Int. Cl.
G02B 26/02 (2006.01)
G03B 21/26 (2006.01)

(52) U.S. Cl. .................. 359/291; 359/224; 359/295; 359/298; 353/30; 353/34; 353/37; 353/49; 353/78; 353/98; 353/99

(58) Field of Classification Search .............. 359/223, 359/224, 290–292, 295, 298; 353/30–32, 353/34, 37, 49–51, 78, 98, 99
See application file for complete search history.

(56) References Cited

U.S. PATENT DOCUMENTS

| | | | |
|---|---|---|---|
| 4,566,935 A | 1/1986 | Hornbeck | |
| 4,615,595 A | 10/1986 | Hornbeck | |
| 5,061,049 A | 10/1991 | Hornbeck | |
| 5,083,857 A | 1/1992 | Hornbeck | |
| 5,784,190 A | 7/1998 | Worley | |
| 5,835,256 A | 11/1998 | Huibers | |
| 6,028,690 A | 2/2000 | Carter et al. | |
| 6,046,840 A | 4/2000 | Huibers | |
| 6,224,216 B1 * | 5/2001 | Parker et al. | 353/31 |
| 6,522,454 B2 | 2/2003 | Meier et al. | |
| 6,523,961 B2 | 2/2003 | Ilkov et al. | |
| 6,529,310 B1 | 3/2003 | Huibers et al. | |
| 6,804,039 B1 | 10/2004 | Doan et al. | |
| 6,867,897 B2 | 3/2005 | Patel et al. | |
| 6,873,450 B2 | 3/2005 | Patel et al. | |
| 2002/0024641 A1 | 2/2002 | Ilkov et al. | |
| 2003/0214639 A1 | 11/2003 | Patel | |
| 2004/0004753 A1 | 1/2004 | Pan | |
| 2004/0125346 A1 | 7/2004 | Huibers | |
| 2004/0156089 A1 | 8/2004 | Doan | |
| 2004/0156090 A1 | 8/2004 | Patel et al. | |

(Continued)

FOREIGN PATENT DOCUMENTS

WO    WO 2004/000720    12/2003

(Continued)

*Primary Examiner*—Evelyn A. Lester
(74) *Attorney, Agent, or Firm*—Wade James Brady, III; Frederick J. Telecky, Jr.

(57) ABSTRACT

A spatial light modulator is disclosed, along with methods for making such a modulator. The spatial light modulator comprises an array of micromirrors each having a hinge and a micromirror plate held via a hinge on a substrate, the micromirror plate being attached to the hinge such that the micromirror plate can rotate along a rotation axis and the hinge structure is located between the micromirror plate and the light source. The mirror plate is formed between the hinge and the substrate on which the hinge is formed. As a result, the hinge is exposed to the incident light during the operation.

38 Claims, 11 Drawing Sheets

U.S. PATENT DOCUMENTS

| | | |
|---|---|---|
| 2004/0233505 A1 | 11/2004 | Huibers et al. |
| 2005/0018091 A1 | 1/2005 | Patel et al. |

FOREIGN PATENT DOCUMENTS

| | | |
|---|---|---|
| WO | WO 2004/001487 | 12/2003 |
| WO | WO 2004/001717 | 12/2003 |
| WO | WO 2004/109363 | 12/2004 |
| WO | WO 2004/109364 | 12/2004 |

* cited by examiner

MICROMIRRORS AND HINGE STRUCTURES FOR MICROMIRROR ARRAYS IN PROJECTION DISPLAYS

TECHNICAL FIELD OF THE INVENTION

The present invention is related generally to the art of microelectromechanical devices, and, more particularly, to micromirrors and methods of making the same.

BACKGROUND OF THE INVENTION

Spatial light modulators (SLMs) are transducers that modulate an incident beam of light in a spatial pattern in response to an optical or electrical input. The incident light beam may be modulated in phase, intensity, polarization, or direction. This modulation may be accomplished through the use of a variety of materials exhibiting magneto-optic, electro-optic, or elastic properties. SLMs have many applications, including optical information processing, display systems, and electrostatic printing.

An early SLM designed for use in a projection display system is described by Nathanson, U.S. Pat. No. 3,746,911. The individual pixels of the SLM are addressed via a scanning electron beam as in a conventional direct-view cathode ray tube (CRT). Instead of exciting a phosphor, the electron beam charges deflectable reflective elements arrayed on a quartz faceplate. Elements that are charged bent towards the faceplate due to electrostatic forces. Bent and unbent elements reflect parallel incident light beams in different directions. Light reflected from unbent elements is blocked with a set of Schlieren stops, while light from bent elements is allowed to pass through projection optics and form an image on a screen. Another electron-beam-addressed SLM is the Eidophor, described in E.Baumann, "The Fischer large-screen projection system (Eidophor)" 20 J.SMPTE 351 (1953). In that system, the active optical element is an oil film, which is periodically dimpled by the electron beam so as to diffract incident light. A disadvantage of the Eidophor system is that the oil film is polymerized by constant electron bombardment and oil vapors result in a short cathode lifetime. A disadvantage of both of these systems is their use of bulky and expensive vacuum tubes.

A SLM in which movable elements are addressed via electrical circuitry on a silicon substrate is described in K. Peterson, "Micromechanical Light Modulator Array Fabricated on Silicon" 31 Appl. Phys. Let. 521 (1977). This SLM contains a 16 by 1 array of cantilever mirrors above a silicon substrate. The mirrors are made of silicon dioxide and have a reflective metal coating. The space below the mirrors is created by etching away silicon via a KOH etch. The mirrors are deflected by electrostatic attraction: a voltage bias is applied between the reflective elements and the substrate and generates an electrostatic force. A similar SLM incorporating a two-dimensional array is described by Hartstein and Peterson, U.S. Pat. No. 4,229,732. Although the switching voltage of this SLM is lowered by connecting the deflectable mirror elements at only one corner, the device has low light efficiency due to the small fractional active area. In addition, diffraction from the addressing circuitry lowers the contrast ratio (modulation depth) of the display.

Another SLM design is the Grating Light Value (GLV) described by Bloom, et al., U.S. Pat. No. 5,311,360. The GLV's deflectable mechanical elements are reflective flat beams or ribbons. Light reflects from both the ribbons and the substrate. If the distance between surface of the reflective ribbons and the reflective substrate is one-half of a wavelength, light reflected from the two surfaces adds constructively and the device acts like a mirror. If this distance is one-quarter of a wavelength, light directly reflected from the two surfaces will interfere destructively and the device will act as a diffraction grating, sending light into diffracted orders. Instead of using active semiconductor circuitry at each pixel location, the approach in the '360 patent relies on an inherent electromechanical bistability to implement a passive addressing scheme. The bistability exists because the mechanical force required for deflection is roughly linear, whereas the electrostatic force obeys an inverse square law. As a voltage bias is applied, the ribbons deflect. When the ribbons are deflected past a certain point, the restoring mechanical force can no longer balance the electrostatic force and the ribbons snap to the substrate. The voltage must be lowered substantially below the snapping voltage in order for the ribbons to return to their undeflected position. Ceramic films of high mechanical quality, such as LPCVD (low pressure chemical vapor deposition) silicon nitride, can be used to form the ribbons. However, there are several difficulties with the GLV. A problem is that a passive addressing scheme might not be able to provide high frame rates (the rate at which the entire SLM field is updated). In addition, with a passive addressing scheme, the ribbons deflect slightly even when off. This reduces the achievable contrast ratio. Also, even though the device is substantially planar, light is scattered, as in the DMD, from areas between the pixels, further reducing the contrast ratio.

Another diffraction-based SLM is the Microdisplay, described in P. Alvelda, "High-Efficiency Color Microdisplays" 307 SID 95 Digest. That SLM uses a liquid crystal layer on top of electrodes arrayed in a grating pattern. Pixels can be turned on and off by applying appropriate voltages to alternating electrodes. The device is actively addressed and potentially has a better contrast ratio than the GLV. However, the device, being based on the birefringence of liquid crystals, requires polarized light, reducing its optical efficiency. Furthermore, the response time of liquid crystals is slow. Thus, to achieve color, three devices—one dedicated for each of the primary colors—must be used in parallel. This arrangement leads to expensive optical systems.

A silicon-based micro-mechanical SLM with a large fractional optically active area is the Digital Mirror Device (DMD), developed by Texas Instruments and described by Hornbeck, U.S. Pat. No. 5,216,537 and other references.

Therefore, what is needed is a spatial light modulator that has a high resolution, a high fill factor, and a high contrast ratio.

SUMMARY OF THE INVENTION

Disclosed herein is a micromirror device having one or more exposed posts to incident light to be modulated. The objects and advantages of the present invention will be obvious, and in part appear hereafter and are accomplished by the present invention that provides a method and apparatus for operating pixels of spatial light modulators in display systems. Such objects of the invention are achieved in the features of the independent claims attached hereto. Preferred embodiments are characterized in the dependent claims. In the claims, only elements denoted by the words "means for" are intended to be interpreted as means plus function claims under 35 U.S.C. §112, the sixth paragraph.

BRIEF DESCRIPTION OF DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE EMBODIMENTS

The micromirror of the present invention comprises a reflective deflectable mirror plate attached to a deformable hinge that is held on a substrate. The mirror plate and the hinge of the micromirror are constructed such that, when used as a member of a micromirror array in a spatial light modulator for modulating a light beam incident thereon, the hinge is exposed to the incident light. Specifically, the hinge blocks a portion of the incident light beam onto the mirror plate. Alternatively, the micromirror can be constructed such that the hinge and the mirror plate are in different planes, and the plane of the hinge is closer to the incident light than the plane of the mirror plate.

Figure 1:
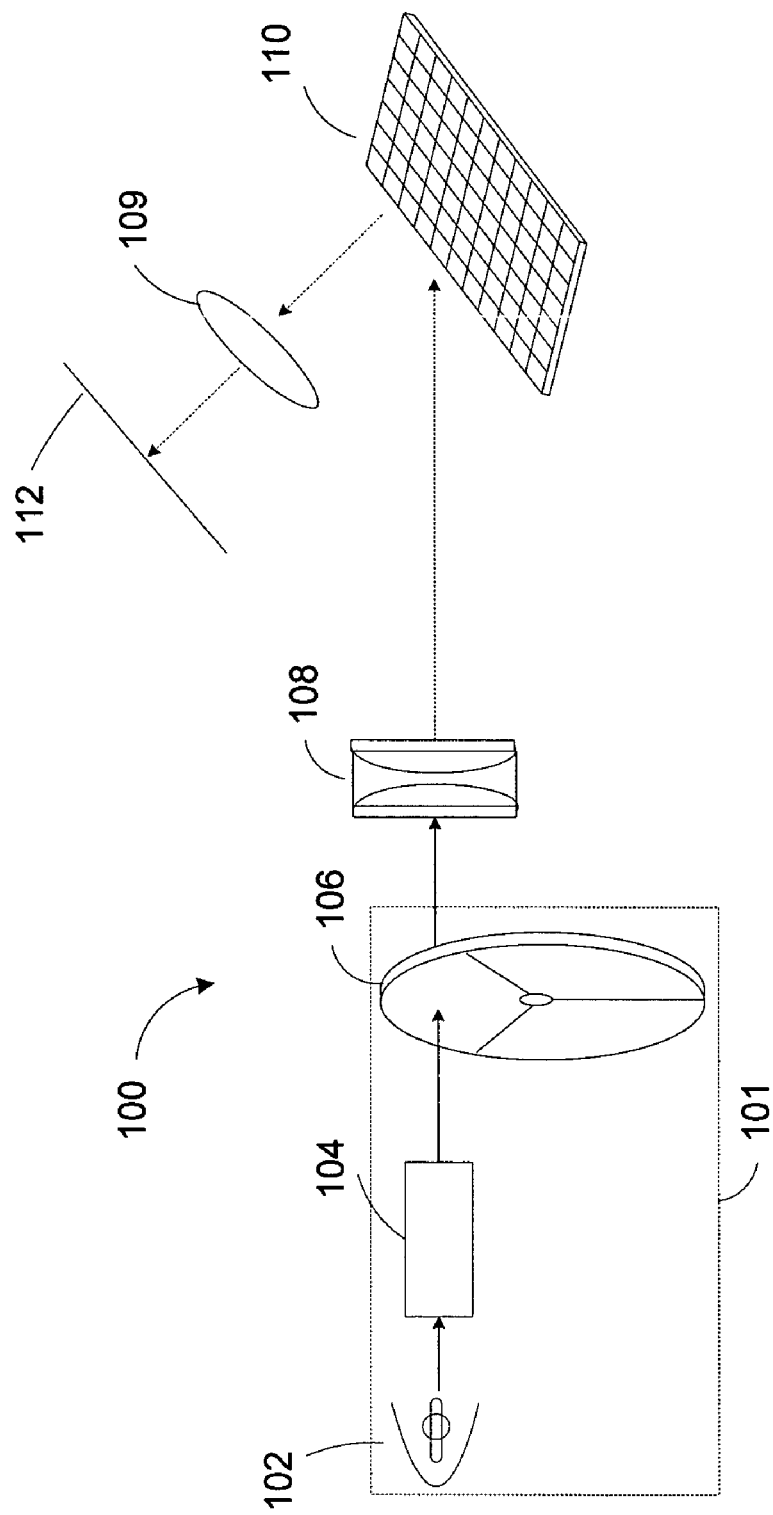
FIG. 1 diagrammatically illustrates an exemplary display system employing a spatial light modulator in which embodiments of the invention can be implemented.

The micromirror of the present invention can compose a micromirror array of a spatial light modulator that can be used in many applications, such as in display systems. FIG. 1 illustrates an exemplary display system having such a spatial light modulator. Referring to FIG. 1, in its basic configuration, display system 100 comprises illumination system 101, optical elements 108 and 109, spatial light modulator 110, and display target 112.

The illumination system provides primary color light that are sequentially applied to the spatial light modulator. In an exemplary configuration, the illumination system light source 102, which can be an arc lamp, lightpipe 104 that can be any suitable integrator of light or light beam shape changer, and color filter 106, which can be a color wheel. In this particular configuration, the color wheel is positioned after the light source and lightpipe on the propagation path of the illumination light from the light source. Of course, other optical configurations can also be used, such as placing the color wheel between the light source and the lightpipe. Optical element 108, which can be a condensing lens, directs the primary color light onto the spatial light modulator in which the primary color light is reflected either into or away from projection lens 109 so as to generate a desired image pattern in the display target. The set of primary colors can comprise any set of three or more colors used to render the output image.

In a number of embodiments of the invention, the micromirror array of the spatial light modulator micromirror array has millions of micromirrors depending upon the desired resolution of the display system. For example, the spatial light modulator may have a resolution of 1024×768 or higher, or 1280×1024 or higher, or 1640×1280 or higher. Of course, the micromirror array device may have a fewer number of micromirrors than in display, or other applications, such as optical switching.

The micromirror array, especially used for display systems, can be constructed having a pitch (the center-to-center distance between adjacent micromirrors) of 25 micrometers or less, or 10.16 micrometers or less, or from 4.38 to 10.16 micrometers. The gap between adjacent micromirrors is approximately of 0.5 micrometers or less, or from 0.1 to 0.5 micrometer. And the mirror plate of the micromirror has a dimension of from 20 micrometers to 10 micrometers.

According to the invention, the micromirror array comprises at least a micromirror whose hinge is exposed to the incident light, and such hinge blocks a portion of the incident light onto the mirror plate. As a way of example, FIG. 2A illustrates an exemplary micromirror of a micromirror array according to an embodiment of the invention.

Figure 2A:
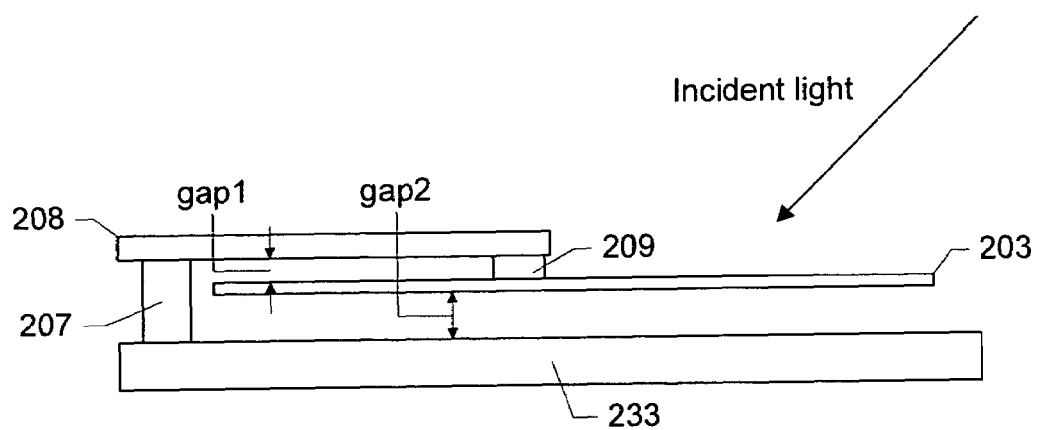
FIG. 2A is a cross-section view of an exemplary micromirror according to an embodiment of the invention.

Referring to FIG. 2A, the micromirror comprises a deflectable mirror plate 203 having a reflective surface exposed to the incident light, a deformable hinge 208, which can be constructed as a torsion hinge, hinge contact 209, post 207, and substrate 233, which can a semiconductor wafer.

Hinge 208 is held on substrate 233 and connected to the substrate by posts 207. Mirror plate 203 is attached to the hinge via hinge contact 209 such that the mirror plate can rotate above the substrate. The hinge, mirror plate, and the substrate are formed on separate planes. Specifically, as shown in the figure, the mirror plate is formed above the substrate and spaced gap1 from the substrate. The hinge is formed above the mirror plate and spaced gap2 from the mirror plate. The hinge, however is exposed to the incident light, and the hinge plane is placed closer to the incident light than the plane of the mirror plate. The hinge blocks a portion of the incident light onto the mirror plate. The two gaps may or may not be the same. However, gap1 between the hinge and the mirror plate is preferably smaller than gap2 between the mirror plate and the substrate. For example, gap2 can be 0.45 microns or less, or from 0.15 to 0.45 microns, as set forth in U.S. patent application Ser. No. 10/627,303 to Patel, filed on Jul. 24, 2003, now U.S. Pat. No. 6,980,347, issued Dec. 27, 2005, the subject matter being incorporated herein by reference.

Figure 2B:
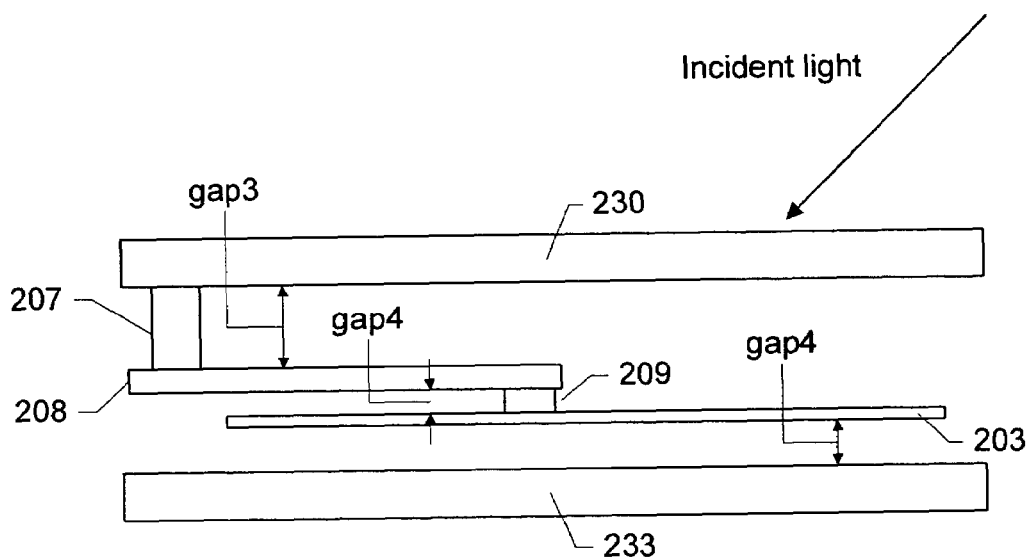
FIG. 2B is a cross-section view of another exemplary micromirror according to yet another embodiment of the invention.

Rather than forming the mirror plate and the hinge on the same substrate as shown in FIG. 2A, the mirror plate and the hinge can be formed on separate substrates, as shown in FIG. 2B. Referring to FIG. 2B, in addition to substrate 233 which is preferably a semiconductor substrate, substrate 230, which is preferably a light transmissive substrate such as glass is provided. Hinge 208 is formed and held on substrate 230 by post 207. Mirror plate 203 is attached to the hinge via hinge contact 209 such that the mirror plate can rotate above substrate 230. The hinge and substrate 230 has gap3 therebetween; and the hinge and the mirror plate has gap4 therebetween. Gap3 and Gap4 may or may not be the same, as set forth in U.S. patent application Ser. No. 10/627,303 to Patel, filed on Jul. 24, 2003, now U.S. Pat. No. 6,980,347, issued Dec. 27, 2005. For addressing and deflecting the mirror plate, an electrode and circuitry (not shown in the figure) is provided, which can be formed on semiconductor substrate 203, which is positioned proximate to the mirror plate. The distance gap4 between substrate 203 and the mirror plate is depending upon the designed electrostatic forced necessary for rotating the mirror plate above substrate 230. Similar to the configuration in FIG. 2A, the micromirror as shown in FIG. 2B is constructed such that the hinge is exposed to the incident light. That is, the hinge and the mirror plate are in different planes, and the hinge plane is closer to the incident light than the mirror plate plane. The hinge blocks a portion of the incident light onto the mirror plate.

Though the relative geometric positions of the mirror plate and the hinge of a micromirror are preferably configured as discussed with reference to FIGS. 2A and 2B, the hinge and mirror plate of a micromirror can be formed in a variety of ways, such as those to be described with reference to FIGS. 3A to 7C.

Figure 3A:
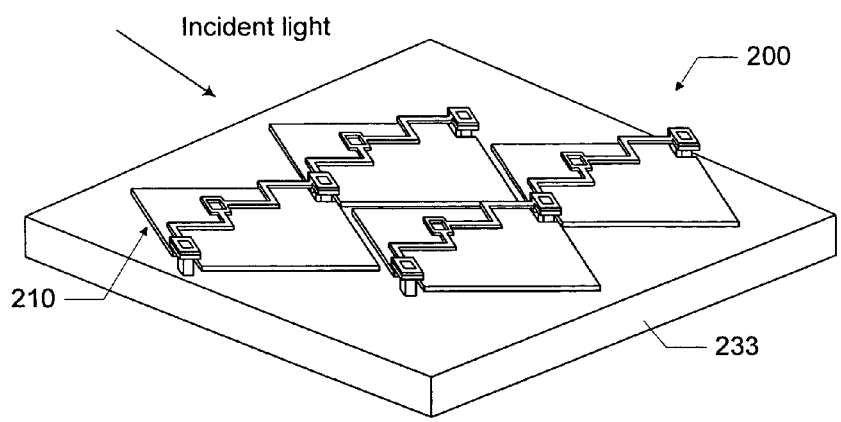
FIG. 3A is a perspective view of a portion of the spatial light modulator having a set of micromirrors according to an embodiment of the invention.

Referring to FIG. 3A, a perspective view of a portion of an exemplary spatial light modulator 200 is illustrated therein. The spatial light modulator comprises micromirror array 210 that is formed on substrate 233, which can be a typical semiconductor wafer that has formed thereon an array of electrodes and circuitry (not shown in FIG. 3A) for electrostatically controlling motions of the micromirrors.

Figure 3B:
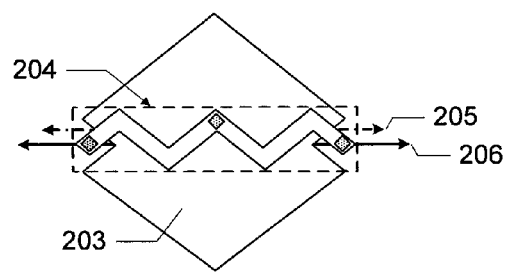
FIG. 3B is a top-view of the hinge structure used in the micromirrors in FIG. 2A.

Micromirror array 210 comprises a plurality of micromirror devices, such as the micromirror device shown on FIG. 3B. Referring to FIG. 3B, a top-view of a micromirror of the micromirror array (e.g. 210) shown in FIG. 3A is illustrated therein. Each micromirror plate (e.g. micromirror 203) is attached to a hinge structure (e.g. hinge structure 204) such that the micromirror plate can pivot along the hinge structure above the substrate (e.g. substrate 233 in FIG. 2A). Each micromirror device further comprises a reflective micromirror plate, such as micromirror plate 203 for reflecting the incident light. In operation, each individual micromirror can be deflected as desired under the control of one or more electrodes and circuit; thereby the spatial modulation of the incident light traveling through substrate 230 and incident on the surfaces of the micromirrors can be achieved. To facilitate the micromirror plate rotating below the substrate for reflecting the incident light, a hinge structure is necessary to hold the micromirror plate above substrate 233 and provide a rotation axis for the micromirror plate.

According to an embodiment of the invention, the micromirror plate is attached to the zigzagging multi-layered hinge structure such that the micromirror plate can rotate along an axis that is parallel to but offset from a diagonal of the micromirror plate. The hinge structures are formed above the semiconductor wafer and the mirror plates such that the hinge structures are exposed to the incident light as illustrated in the figure. As a way of example, micromirror plate 203 has a well defined geometrical diagonal 206. However, the rotation axis of the micromirror plate is along direction 205 that is parallel to but offset from diagonal 206. Such a rotation axis can be achieved by attaching the hinge structure to the mirror plate at a point not along the mirror plate diagonal 206. The point of attachment can be at least 0.5 um, at least 1 um, or at least 2 um away from the diagonal 206. In one embodiment, the point of attachment is from 1/40 to 1/3 the length of the diagonal away from diagonal 206, or from 1/20 to 1/4 if desired—although any desired distance away from the diagonal is possible if so desired in the present invention. In the present invention, the micromirror preferably has a substantially four-sided shape. Whether the micromirror is a rectangle, square, rhombus or trapezoid, even if the corners are rounded or "clipped" or if an aperture or protrusion is located on one or more of the sides of the micromirror, it is still possible to conceptually connect the four major sides of the micromirror shape and take a diagonal across the middle of the micromirror. In this way, a center diagonal can be defined even if the micromirror plate is substantially but not perfectly a rhombus, trapezoid, rectangle, square, etc. However, the rotation axis of the micromirror plate is not along the center diagonal but is along direction 205 that is parallel to but offset from diagonal 206. By "parallel to but offset from the diagonal" it is meant that the axis of rotation can be exactly parallel to or substantially parallel to (±19 degrees) the diagonal of the micromirror. This type of design benefits the performance of the micromirror device in a number of ways. One advantage of this asymmetric offset arrangement is that the micromirror plate can rotate at a larger angle than the rotation angle that can be achieved in a symmetrical arrangement (with a mirror plate—substrate gap being the same). The length of the diagonal of the mirror plate is preferably 25 microns or less.

In order to hold the micromirror plate and meanwhile, provide a rotation axis for the micromirror plate for rotating above the substrate, each hinge structure, such as hinge structure 204, further comprises posts 207, hinge 208, and contact 209 as shown in FIG. 2A. By "hinge" is meant the layer or stack of layers that defines that portion of the device that flexes to allow movement of the device (described in detail below). To improve the performance of the micromirror plate, further fine structures can also be provided thereon. Specifically, mirror stops can be formed on the edges for stopping the rotation of the micromirror plate when the micromirror plate achieves a certain angle. The geometrical arrangement, such as the length and the position of the mirror stop from the hinge-plate, along with the distance between the micromirror plate and the hinge determines the maximum rotation angle that the micromirror can achieve before contact. By properly setting the mirror stops for all micromirror plates in the micromirror array, a maximum rotation angle for all micromirrors can be uniformly defined. This uniformly defined rotation angle can then be defined as an "ON" state for all micromirrors in operation. In this case, all micromirrors in the spatial light modulator rotate to the uniformly defined angle in the "ON" state in an operation. The incident light can thus be uniformly reflected towards one desired direction for display. Obviously, this significantly improves the quality of the displayed image. Though preferred, the number of the mirror stops can be of any desired number (one or more) or need not be provided at all. And each mirror stop can be of any desired shape, though preferably one that minimizes the amount of contact between the mirror stop and the micromirror plate.

In this embodiment of the invention, the two posts are formed on the substrate. The hinge (e.g. hinge 204) is supported by the two posts above the substrate and attached to the micromirror plate via the contact (e.g. contact 209). In this configuration, the micromirror plate can pivot below the hinge and above the substrate.

Figure 3C:
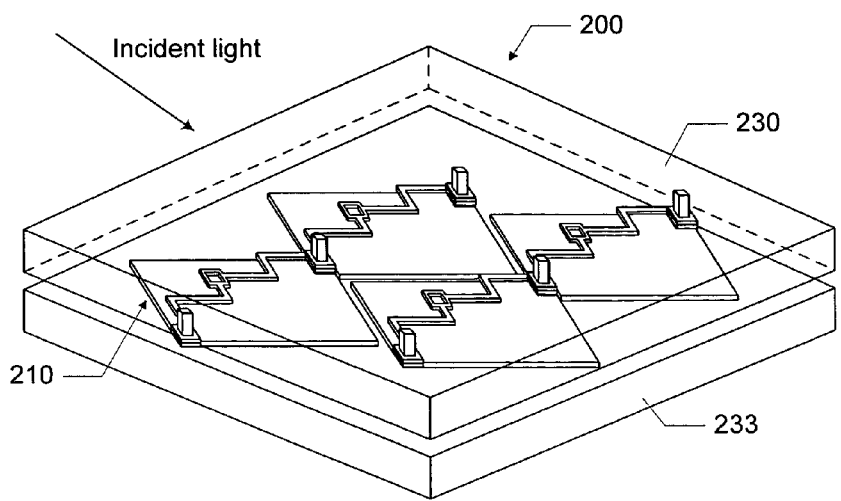
FIG. 3C is a perspective view of a portion of the spatial light modulator having a set of micromirrors according to another embodiment of the invention.

Instead of forming the hinge structures on the semiconductor wafer, the hinge structures can be formed on another substrate, such as glass that is positioned proximate to semiconductor substrate 233, as shown in FIG. 3C. Referring to FIG. 3C, hinge structures are formed on glass substrate 230 via a plurality of posts. Mirror plates 210 are attached to the hinge structures such that the mirror plates can rotate relative to the glass substrate. Semiconductor substrate 233 having an array of electrodes and circuitry formed thereon is positioned proximate to the mirror plates and the glass substrate for electrostatically deflecting the mirror plates. In operation, incident light travels through the glass substrate and impinges the mirror plates. Under the control of the electrodes and circuitry on the semiconductor substrate, the mirror plates are individually deflected so as to reflecting the incident light into the different direction.

Figure 4A:
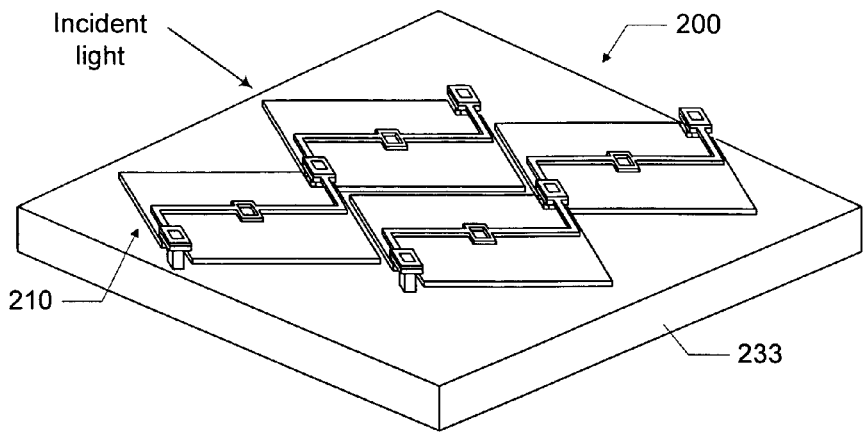
FIG. 4A illustrates a perspective view of a portion of the spatial light modulator having a set of micromirrors according to yet another embodiment of the invention.
Figure 4B:
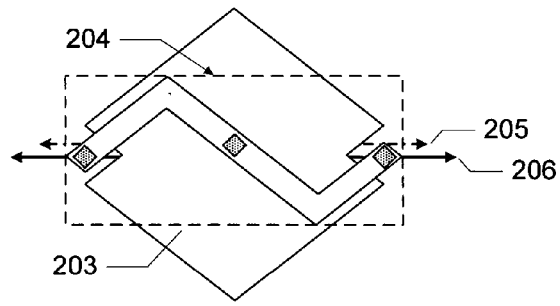
FIG. 4B is a top-view illustrating the hinge structure of the micromirrors in FIG. 3A.

The hinge structure can take other suitable forms as desired. FIG. 4A illustrates a perspective view of another zigzagging multi-layered hinge structure design according to another embodiment of the invention. FIG. 4B illustrates a top view of a micromirror of the micromirror array in FIG. 4A. Similar to that of FIG. 3A, the hinge structures of the micromirrors are formed on a semiconductor substrate, such as substrate 233. The mirror plates are formed between the hinge structures and the semiconductor substrate. As a result, the hinge structures are exposed to the incident light as illustrated in the figure.

Figure 4C:
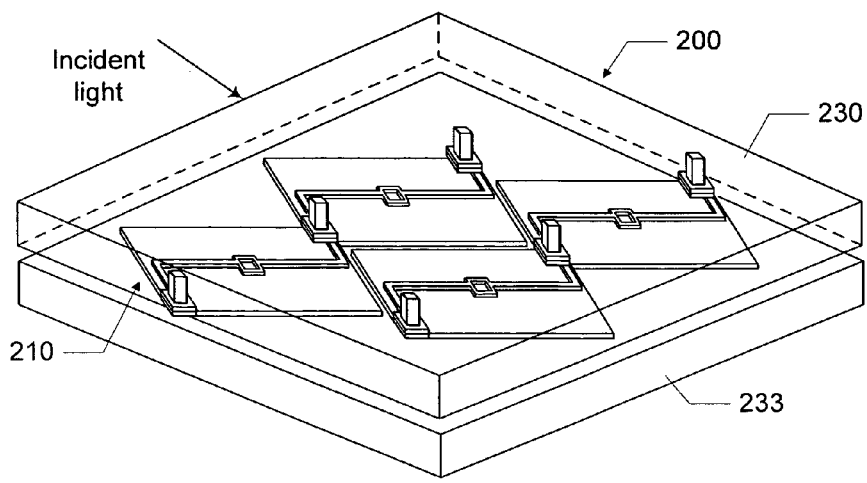
FIG. 4C illustrates a perspective view of a portion of the spatial light modulator having a set of micromirrors according to yet another embodiment of the invention.

The hinge structure can also be formed on a substrate other than the semiconductor substrate, as shown in FIG. 4C. Referring to FIG. 4C, the hinge structures are formed on glass substrate 230 that is transmissive to visible light. The hinge structures are connected to the glass substrate via a plurality of posts. Mirror plates of the micromirror devices are attached to the hinge structures such that the mirror plates can rotate relative to the glass substrate. In operation, incident light passes through the glass substrate ant impinges the mirror plates. Under the control of the electrodes and circuitry on the semiconductor substrate, the mirror plates modulate the incident light so as to produce images.

Figure 5A:
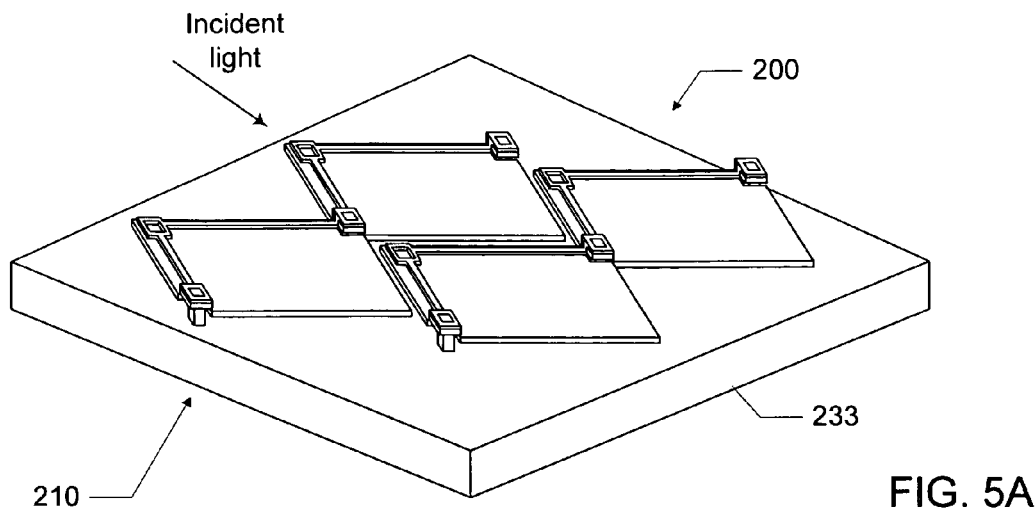
FIG. 5A illustrates a perspective view of a portion of the spatial light modulator having a set of micromirrors according to yet another embodiment of the invention.
Figure 5B:
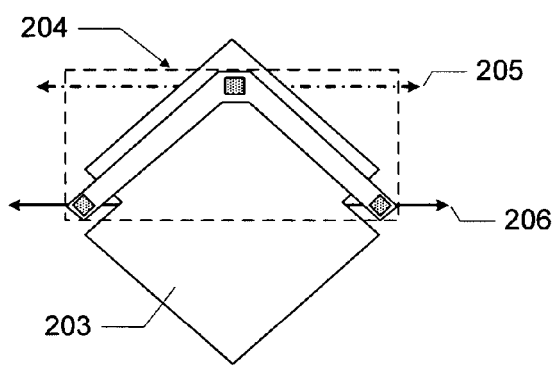
FIG. 5B is a top-view illustrating the hinge structure of the micromirrors in FIG. 4A.
Figure 5C:
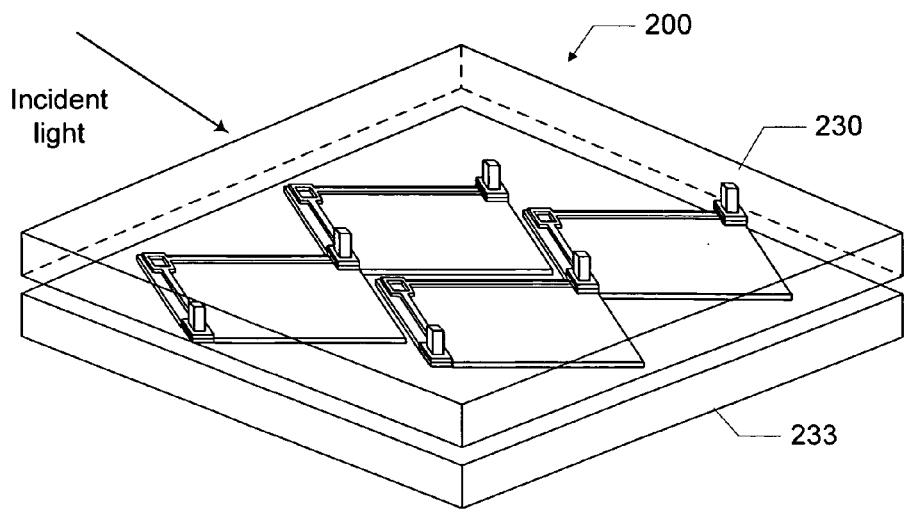
FIG. 5C illustrates a perspective view of a portion of the spatial light modulator having a set of micromirrors according to yet another embodiment of the invention.

Referring to FIG. 5A, a hinge structure is presented according to another embodiment of the invention. A top view of a micromirror of the micromirror array in FIG. 5A is illustrated in FIG. 5B. Similar to the previous examples, the hinge structures are formed on the semiconductor substrate for supporting micromirror plates and provide rotation axes for the micromirror plates. The hinge structures are exposed to incident light during operation. Alternatively, the hinge structures and the mirror plates can also be formed on another substrate other than the semiconductor substrate, as shown in FIG. 5C. In this case, the substrate on which the hinge structures are formed is glass that is transmissive to visible light.

Figure 6A:
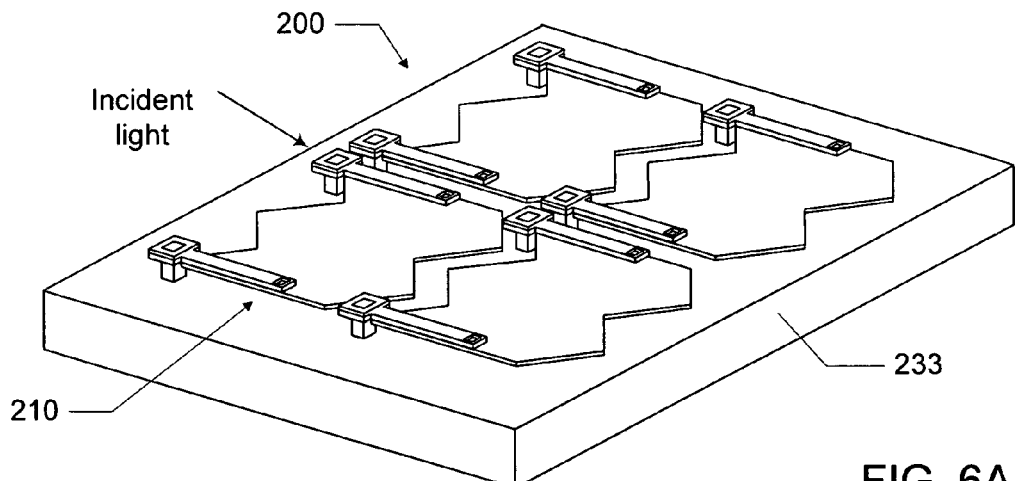
FIG. 6A illustrates a perspective view of a portion of the spatial light modulator having a set of micromirrors according to yet another embodiment of the invention.

In the embodiments discussed above, the hinge-supports of all micromirror devices form a continuous hinge-support frame for all micromirror plates, but that is not an absolute requirement. Moreover, the posts of each hinge structure are not required to be formed along a diagonal of the micromirror plate. Referring to FIG. 6A, two posts of the hinge structure can be formed along the edges of the micromirror plate instead of at the corners of the same. In this embodiment the hinge structure 204 provides a rotation axis for the micromirror plate, which in this case is parallel to one of the prominent sides of micromirror plate. Naturally, the asymmetric offset arrangement is also preferred in this case.

Figure 6B:
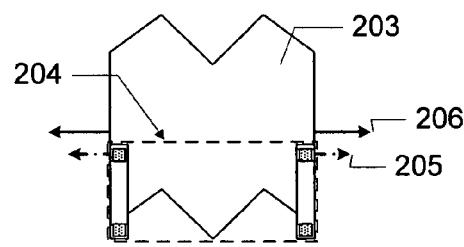
FIG. 6B is a top-view illustrating the hinge structure of the micromirrors in FIG. 5A.
Figure 6C:
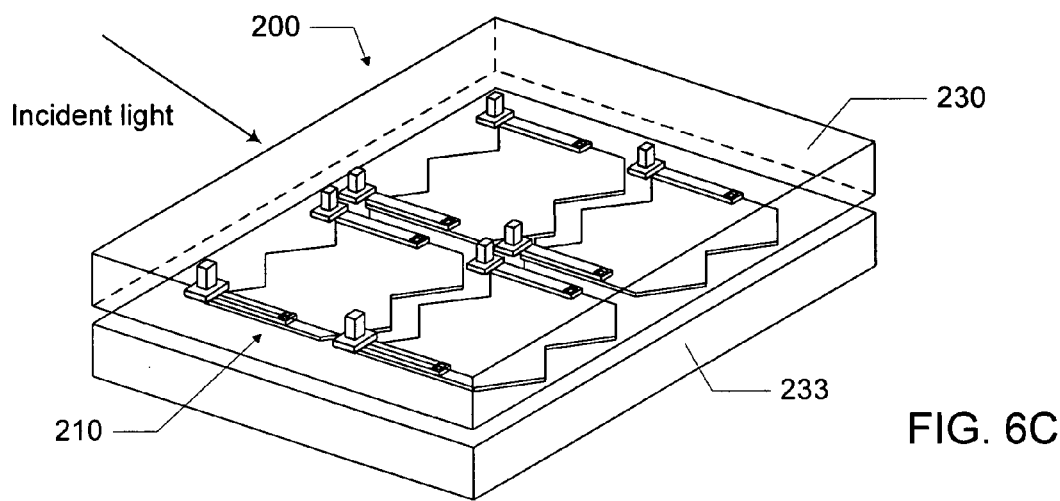
FIG. 6C illustrates a perspective view of a portion of the spatial light modulator having a set of micromirrors according to yet another embodiment of the invention.

A top view of a micromirror of the micromirror array in FIG. 6A is illustrated in FIG. 6B. Rather than forming the hinge structure and the mirror plates on the semiconductor substrate, the hinge structures and the mirror plates can be formed on a glass substrate that is transmissive to visible light, as shown in FIG. 6C.

Figure 7A:
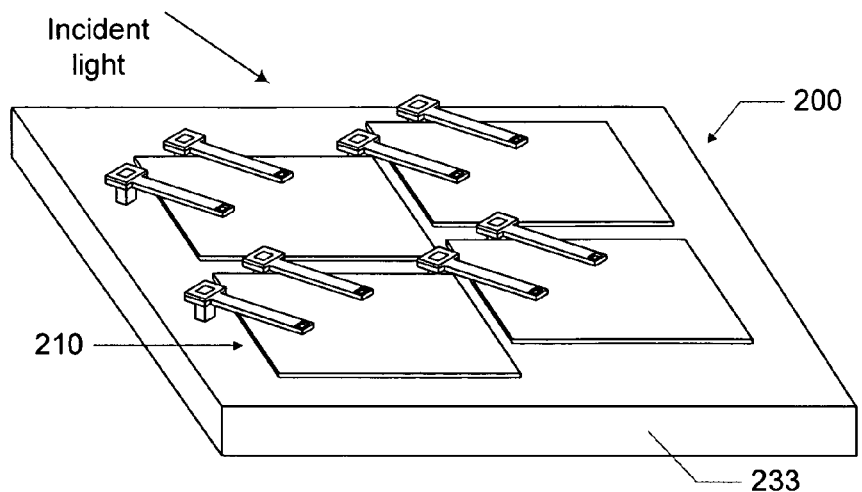
FIG. 7A illustrates a perspective view of a portion of the spatial light modulator having a set of micromirrors according to yet another embodiment of the invention.
Figure 7B:
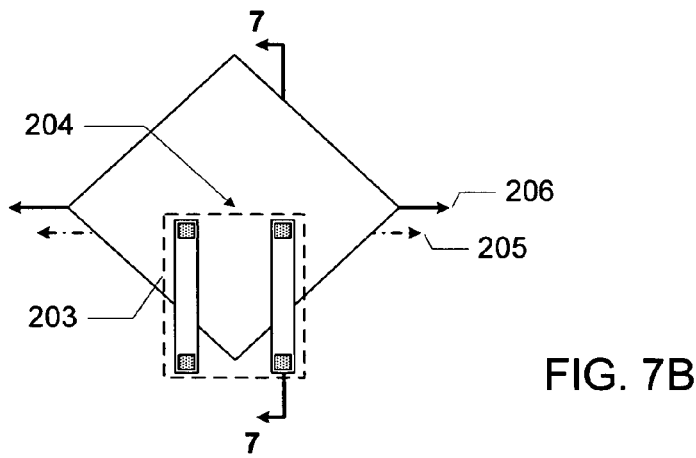
FIG. 7B is a top-view illustrating the hinge structure of the micromirrors in FIG. 6A.
Figure 7C:
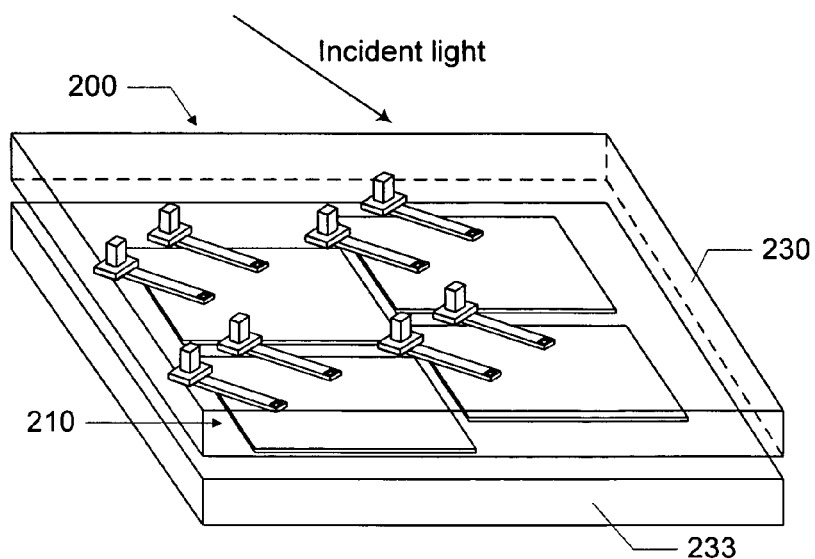
FIG. 7C illustrates a perspective view of a portion of the spatial light modulator having a set of micromirrors according to yet another embodiment of the invention.

Referring to FIG. 7A, a perspective view of a micromirror array is presented according to another embodiment of the invention. Similar to the previous case, hinge posts are formed on the substrate along the edges of the micromirror plate instead of at the corners of the same, providing a rotation axis for the micromirror plate, which is parallel to, but offset from a diagonal of micromirror plate. The mirror plates are located between the hinge structures and the semiconductor substrate such that the hinge structures are exposed to the incident light during operation. Similar to those in FIGS. 3C, 4C, 5C, and 6C, the hinge structures and the mirror plates can be formed on a glass substrate, as shown in FIG. 7C.

There is a variety of ways to construct the micromirror devices described above. Exemplary processes will be discussed in the following with references to FIG. 8A through FIG. 8G. It should be appreciated by those ordinary skills in the art that the exemplary processes are for demonstration purposes only and should not be interpreted as limitations.

Figure 8A:
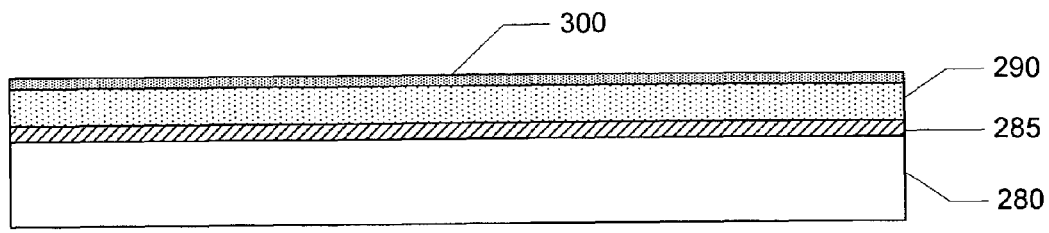
FIG. 8A to FIG. 8G are cross-sectional views of structures illustrating a method for forming a micromirror device according an embodiment of the invention.

Referring to FIG. 8A, substrate 280 is provided. First sacrificial layer 290 is deposited on the substrate followed by the deposition of micromirror plate layer 300. The substrate in this case is a semiconductor substrate (e.g. silicon substrate) with one or more actuation electrodes and/or control circuitry (e.g. CMOS type DRAM) formed thereon.

First sacrificial layer 290 is deposited on substrate 280. First sacrificial layer 290 may be any suitable material, such as amorphous silicon, or could alternatively be a polymer or polyimide, or even polysilicon, silicon nitride, silicon dioxide, etc. depending upon the choice of sacrificial materials, and the etchant selected. If the first sacrificial layer is amorphous silicon, it can be deposited at 300-350° C. The thickness of the first sacrificial layer can be wide ranging depending upon the micromirror size and desired title angle of the micro-micromirror, though a thickness of from 500 Å to 50,000 Å, preferably around 10,000 Å, is preferred. The first sacrificial layer may be deposited on the substrate using any suitable method, such as LPCVD or PECVD.

As an optional feature of the embodiment, anti-reflection layer 285 may be deposited on the surface of the substrate for one embodiment of the invention. The anti-reflection layer is deposited for reducing the reflection of the incident light from the surface of the substrate. Alternatively, other optical enhancing layers may be deposited on either surface of the glass substrate as desired.

After depositing the first sacrificial layer, a plurality of structure layers will be deposited and patterned as appropriate. According to the invention, a structural layer is a layer that will not be removed after the removal of the sacrificial layers. The first structural layer deposited on the first sacrificial layer is micromirror plate layer 300 for forming a micromirror. Because the micromirror is designated for reflecting incident light in the spectrum of interest (e.g. visible light spectrum), it is preferred that the micromirror plate layer comprises of one or more materials that exhibit high reflectivity (preferably 90% or higher) to the incident light.

In accordance with one embodiment of the invention, micromirror plate layer 300 can be a multi-layered structure, as shown in FIG. 12. Referring to FIG. 12, the hinge layer may comprise light reflective layer 303 and enhancing layer 305. The light reflecting layer may comprise one or more materials exhibiting high light reflectivity. Examples of such materials are Al, Ti, $AlSi_xCu_y$, or $TiAl_x$. In a preferred embodiment of the invention, the light reflecting layer is aluminum with a thickness of 2500 Å. This aluminum layer is preferred to be deposited at 150° C. or other temperatures preferably less than 400° C. The enhancing layer may comprise a metal or metal alloy for enhancing the electric and mechanical properties of the micromirror plate. An example of such enhancing layer is titanium with a thickness of 80 Å. Of course, other suitable materials having high reflectivity to the incident light of interest may also be adopted for the micromirror plate. For example, the light reflecting layer can also be an electro-conducting layer that comprises a material having a resistivity less than 10,000 μΩ·cm. In this situation, light reflecting and enhancing layer can be laminated by two protecting layers, such protecting layers 307 and 301, that are preferably insulators with resistivities greater than 10,000 μΩ·cm. And the enhancing layer can be is an electro-conducting layer with a resistivity also less than 10,000 μΩ·cm.

In fact, one or more protecting layers can be provided regardless whether the light reflecting layer is conducting or not. For example, a protecting layer (e.g. protecting layer 301) can be deposited on the light reflecting layer for protecting the light reflecting layer. In addition, another protecting layer (e.g. protecting layer 307) can be provided, on which the enhancing layer can be deposited. In this way, the light reflecting layer and the enhancing layers are laminated between the outmost protecting layers.

The protecting layers can be made of any suitable materials, preferably a material of electrically and/or mechanically stable. For example, the protecting layer may be $SiO_x$ with a preferred thickness of 400 Å. Of course, other suitable materials may also be employed herein.

In depositing the micromirror plate layer(s), PVD is preferably used at 150° C. The thickness of the micromirror plate layer can be wide ranging depending upon the desired mechanical (e.g. elastic module), the size of the micromirror, desired titled angle and electronic (e.g. conductivity) properties of the micromirror plate and the properties of the materials selected for forming the micromirror plate. According to the invention, a thickness of from 500 Å to 50,000 Å, preferably around 2500 Å, is preferred.

Figure 8B:
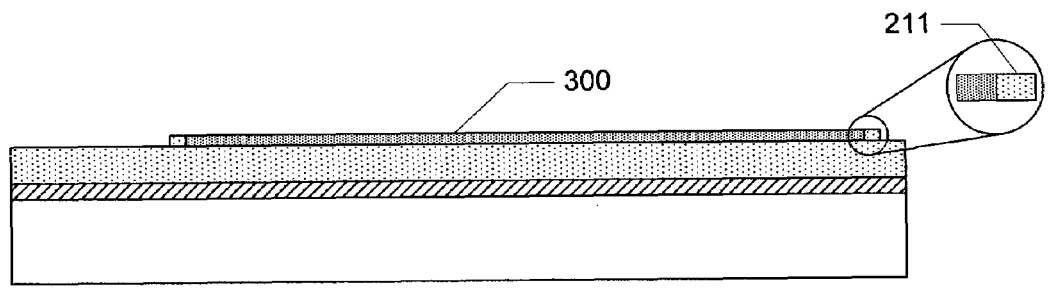

The micromirror plate layer 300 is then patterned into a desired shape, as shown in FIG. 8B. The patterning of the micromirror can be achieved using standard photoresist patterning followed by etching using, for example CF4, C12, or other suitable etchant depending upon the specific material of the micromirror plate layer.

Figure 8C:
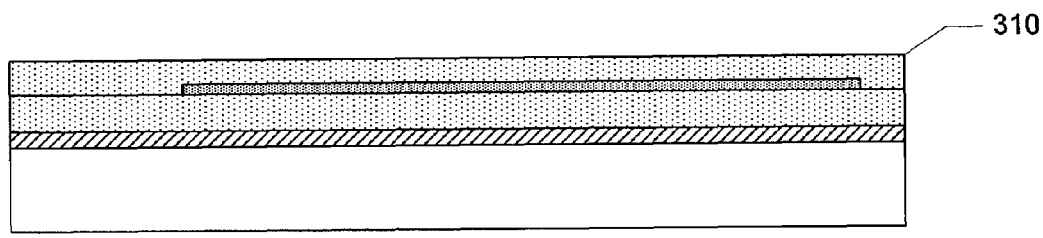

After the formation of the micromirror plate, further structural layers are deposited and patterned. Specifically, a plurality of layers of the hinge structure will be deposited and patterned for forming the hinge structure. Referring to FIG. 8C, before depositing further structural layers, second sacrificial layer 310 is deposited on top of the micromirror plate 300 and first sacrificial layer 290. Second sacrificial layer 310 may comprise amorphous silicon, or could alternatively comprise one or more of the various materials mentioned above in reference to first sacrificial layer 290. First and second sacrificial layers need not be the same, though are the same in the preferred embodiment so that, in the future, the etching process for removing these sacrificial layers can be simplified. Similar to the first sacrificial layer, second sacrificial layer 310 may be deposited using any suitable method, such as LPCVD or PECVD. If the second sacrificial layer comprises amorphous silicon, the layer can be deposited at 350° C. The thickness of the second sacrificial layer can be on the order of 9000 Å, but may be adjusted to any reasonable thickness, such as between 2000 Å and 20,000 Å depending upon the desired distance (in the direction perpendicular to the micromirror plate and the substrate) between the micromirror plate and the hinge. It is preferred that the hinge and mirror plate be separated by a gap after release of at least 0.5 um (this can be at least 1 um or even 2 um or more if desired). Second sacrificial layer 310 may also fill in the trenches left from the patterning of the micromirror plate.

In accordance with the operation mechanism of the micromirror plate and the constructional design, it is desired that the posts comprise materials that are insusceptible to elastic deformation (e.g. fatigue, creep, dislocation motion) during the operation of the device. It is also preferred that such materials have large elastic modulus and exhibits high stiffness. Opposite to that of the posts, the materials of the hinge are expected to be more compliant because the hinge deforms while the micromirror plate pivots. Moreover, the hinge is desired to be electrically conducting such that the micromirror plate can be held at a particular voltage level.

In the preferred embodiment of the invention, the micromirror plate layer comprises an aluminum layer, and the second sacrificial layer is silicon. This design, however, can cause defects in the hinge structure due to the diffusion of the aluminum and silicon at the edges of the micromirror plate, wherein the aluminum is exposed to the silicon. To solve this problem, a protection layer (not shown) may be deposited on the patterned micromirror plate before depositing the second sacrificial silicon layer such that the aluminum layer can be isolated from the silicon sacrificial layer. Then the protection layer is patterned according to the shape of the micromirror plate. After the patterning, segments of the protection layer (e.g. segment 211 in FIG. 8B) cover the edges of the micromirror plate for isolating the aluminum and the silicon sacrificial layer.

Figure 8D:
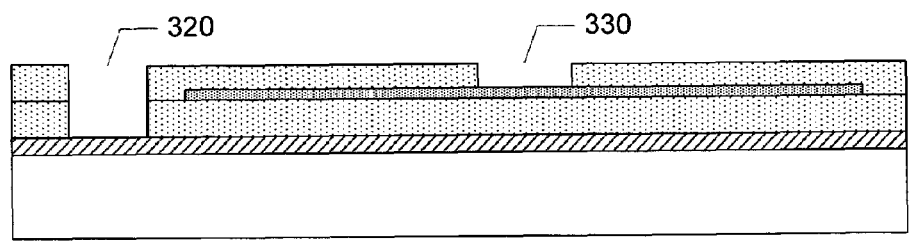

The deposited second sacrificial layer is patterned afterwards for forming one deep-via area 320 and a shallow via area 330 using standard lithography technique followed by etching, as shown in FIG. 8D. The etching step may be performed using $Cl_2$, $BCl_3$, or other suitable etchant depending upon the specific material(s) of the second sacrificial layer. In order to form shallow-via area 330, an etching step using $CF_4$ or other suitable etchant may be executed. The shallow-via area, which can be of any suitable size, is preferably on the order of 2.2 μm on a side.

Figure 8E:
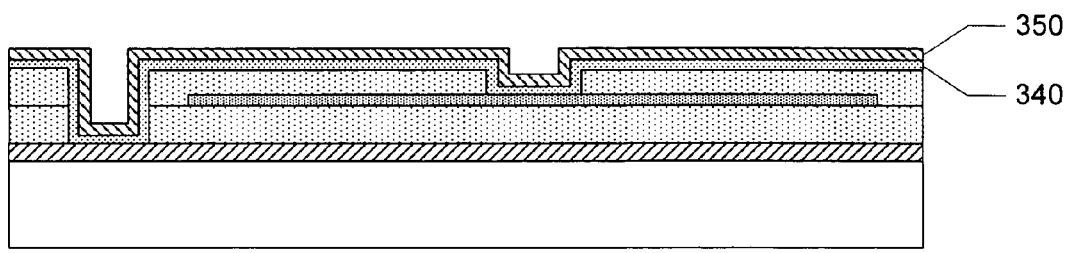

Referring to FIG. 8E, hinge-support layers 340 and 350 are deposited on the patterned second sacrificial layer 310. Because the hinge-support layers (layers 340 and 350) are designated for holding the hinge (e.g. hinge 208 in FIG. 2A)

and the micromirror plate (e.g. 203 in FIG. 2A) attached therewith such that the micromirror plate can pivot along the hinge, it is desired that the hinge support layers comprise of materials having at least large elastic modulus. According to an embodiment of the invention, layer 340 comprises a 400 Å thickness of $TiN_x$ (although it may comprise $TiN_x$, and may have a thickness between 100 Å and 2000 Å) layer deposited by PVD, and a 3500 Å thickness of $SiN_x$ (although the thickness of the SiNx layer may be between 2000 Å and 10,000 Å) layer 350 deposited by PECVD. Of course, other suitable materials and methods of deposition may be used (e.g. methods, such as LPCVD or sputtering). The $TiN_x$ layer is not necessary for the invention, but provides a conductive contact surface between the micromirror and the hinge in order to, at least, reduce charge-induced stiction. According to the embodiment of the invention, layers 340 and 350 are deposited such that an inwards compression strain and outwards tensile strain are inherently presented for forming a curved hinge-support. Alternatively, the $TiN_x$ and SiNx layers can also be deposited such that the intrinsic stress is as low as possible, preferably lower than 250 MPa for forming a flat hinge-support. In either case, the $SiN_x$ layer can be deposited at 400° C.

Figure 8F:
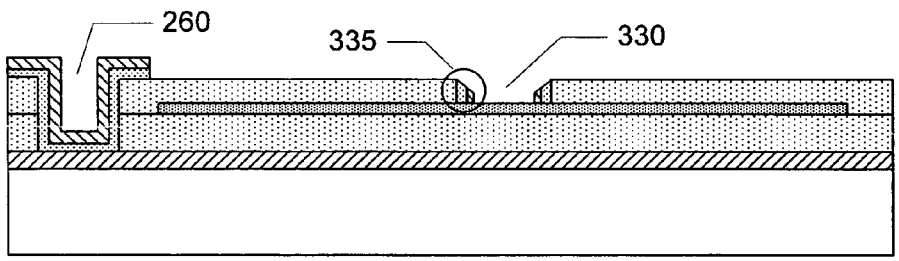

After the deposition, layers 340 and 350 are patterned into a desired configuration (e.g. hinge 204 in FIG. 3B), as shown in FIG. 8F. Post 260 can take any desired forms; alternatively, the posts may be formed as a diamond. The mirror stops, such as the mirror stops corresponding to the "ON" state and/or mirror stops (not shown) corresponding to the "OFF" state can also be configured. An etching step using one or more proper etchants is then performed afterwards. In particular, the layers can be etched with a chlorine chemistry or a fluorine chemistry where the etchant is a perfluorocarbon or hydrofluorocarbon (or $SF_6$) that is energized so as to selectively etch the hinge support layers both chemically and physically (e.g. a plasma/RIE etch with $CF_4$, $CHF_3$, $C_3F_8$, $CH_2F_2$, $C_2F_6$, $SF_6$, etc. or more likely combinations of the above or with additional gases, such as $CF_4/H_2$, $SF_6/Cl_2$, or gases using more than one etching species such as $CF_2Cl_2$, all possibly with one or more optional inert diluents). Different etchants may, of course, be employed for etching each hinge support layer (e.g. chlorine chemistry for a metal layer, hydrocarbon or fluorocarbon (or $SF_6$) plasma for silicon or silicon compound layers, etc.). Alternatively, the etching step can be performed after deposition of each hinge support layer. For example, layer 340 can be etched and patterned after its deposition and before the deposition of layer 350.

After etching layers 340 and 350, a post 260 and a contact area 330 are formed. The bottom segment of contact area 330 is removed by etching and the part of the micromirror plate underneath the contact area is thus exposed. The exposed part of micromirror 203 will be used to form an electric-contact with external electric source. The sidewalls (e.g. 335) of contact area 330 are left with residues of layers 340 and 350 after etching. The residue 335 has a slope measured by angle θ approximately 75 degrees, but may vary between 0 and 89 degrees. The residue on the sidewalls helps to enhance the mechanical and electrical properties of the hinge that will be formed afterwards. In other embodiments, there can be more post on either side of the mirror forming a continuous element with the posts corresponding to the adjacent micromirror in an array as shown in FIG. 3A.

Figure 8G:
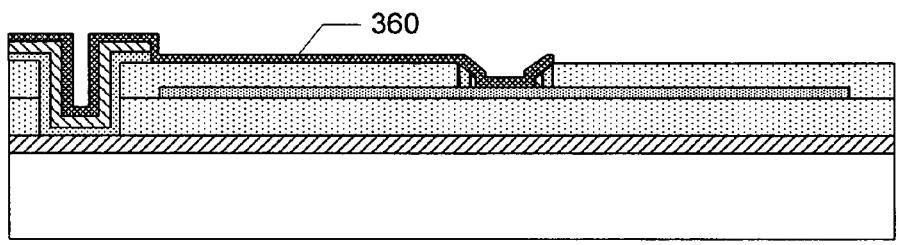

After the completion of patterning and etching of layers 340 and 350, hinge layer 360 is deposited and then patterned as shown in FIG. 8G. Because the hinge provides a rotation axis for the micromirror plate, it is natural to expect that the hinge layer comprises a material that is at least susceptible to plastic deformation (e.g. fatigue, creep, and dislocation motion). Furthermore, when the hinge layer is also used as electric contact for the micromirror plate, it is desired that the material of the hinge layer is electrically conductive. Examples of suitable materials for the hinge layer are silicon nitride, silicon oxide, silicon carbide, polysilicon, Al, Ir, titanium, titanium nitride, titanium oxide(s), titanium carbide, $CoSiN_x$, $TiSiN_x$, $TaSiN_x$, or other ternary and higher compounds. When titanium is selected for the hinge layer, it can be deposited at 100° C. Alternatively, the hinge layer may comprise of multi-layers, which will be discussed in detail in the following.

A hinge is expected to function both as a reliable mechanical element and as a robust electrical conductor. Conductors on MEMS devices are generally metals (e.g. Al, Ti, W, Cu, or Ta), metal alloys (e.g. Al—1 wt. % Cu, or Al—1 wt. % Si—1 wt % Cu), metal nitrides (e.g. TiN or TaN) or metal silicides (e.g. TiSi2, WSi2, or TaSi2). These materials are often poor mechanical elements, especially over long times and large numbers of cycles and in MEMS applications where the amount of strain required for failure is very small. The purpose of this embodiment is to reduce the residual displacement in a composite hinge in the rest state by choosing a conductor with a very low elastic modulus compared to that of the robust mechanical element(s) that makes up the rest of the hinge. In an embodiment of the invention, the hinge comprises a $TiN_x$ (e.g. 100 Å in thickness) layer and $SiN_x$ layer (e.g. 400 Å in thickness), although the material could include silicon nitride, silicon dioxide, polysilicon, or any suitable material. The hinge may further comprise a conductive polymer formed on top of the $SiN_x$ layer. Any conductive polymer might be used, such as polypyrrole, polyaniline, or poly (3,4-ethylenedioxythiophene)poly(styrenesulfonate). Alternatively, the conductive layer could be any conductive material that is compliant including metals formed with a distribution of pores, very compliant metals, or any suitable material.

Figure 9:
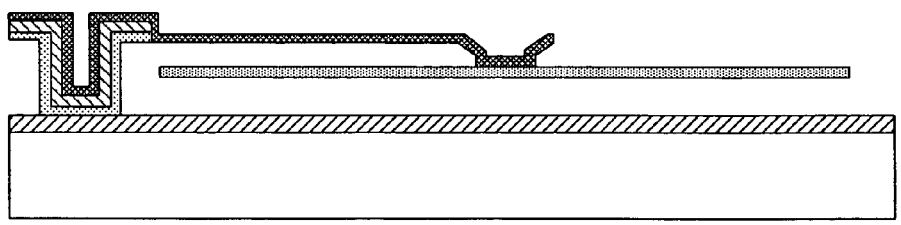
FIG. 9 is a cross-sectional view of micromirror device thus obtained according to an embodiment of the invention.

After all structural layers are deposited and patterned according to the desired configuration, the sacrificial layers and the removable barrier layers are removed using a spontaneous vapor phase chemical etchant. According to the invention, the etchant is selected from a group comprising interhalogen (e.g. bromine trifluoride), noble gas halide (e.g. xenon difluoride) and HF, and more preferably xenon difluoride. It is further preferred that the chemical etchant is mixed with a diluent gas, which is preferably an inert gas selected from $N_2$, He, Ne, Ar, Kr, and Xe, and more preferably He and $N_2$, as set forth in U.S. patent applications, Ser. No. 09/427,841 to Patel, filed Oct. 26, 1999; Ser. No. 09/649,569 to Patel, filed Aug. 28, 2000; and Ser. No. 10/269,149 to Patel, filed Oct. 12, 2002, the subject matter of each being incorporated herein by reference. A cross-sectional view of the released micromirror device is presented in FIG. 9.

In the above described exemplary fabrication process, the processes for forming the hinge support (e.g. processes described in FIG. 8A to FIG. 8F) and the process for forming the hinge itself (e.g. process described in FIG. 8G) are performed consecutively. In particular, the patterning and etching of the hinge support is followed by the deposition, patterning and etching of the hinge. The hinge and the hinge support can be formed simultaneously according to another embodiment of the invention.

Another exemplary process for constructing the micromirror devices described above will be discussed in the following with references to FIG. 10A through FIG. 10G. It should be appreciated by those ordinary skills in the art that the exemplary processes are for demonstration purpose only and should not be interpreted as limitations.

Figure 10A:
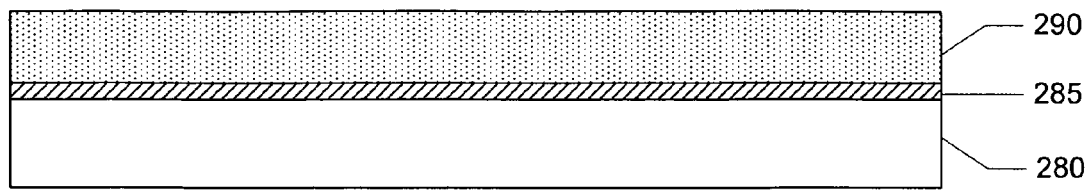
FIGS. 10A to 10G are cross-sectional views of structures illustrating another method for forming a micromirror device according to another embodiment of the invention.

Referring to FIG. 10A, substrate 280 is provided. A first sacrificial layer 290 is deposited on the substrate, which is a light transmissive substrate such as glass (e.g. 1737F, Eagle 2000), quartz, Pyrex™, or sapphire.

First sacrificial layer 290 is deposited on substrate 280. First sacrificial layer 290 may be any suitable material, such as amorphous silicon, or could alternatively be a polymer or polyimide, or even polysilicon, silicon nitride, silicon dioxide, etc. depending upon the choice of sacrificial materials, and the etchant selected. If the first sacrificial layer is amorphous silicon, it can be deposited at 300-350° C. The thickness of the first sacrificial layer can be wide ranging depending upon the micromirror size and desired title angle of the micro-micromirror, though a thickness of from 500 Å to 50,000 Å, preferably around 10,000 Å, is preferred. The first sacrificial layer may be deposited on the substrate using any suitable method, such as LPCVD or PECVD.

As an optional feature of the embodiment, anti-reflection layer 285 may be deposited on the surface of the substrate for one embodiment of the invention. The anti-reflection layer is deposited for reducing the reflection of the incident light from the surface of the substrate. Alternatively, other optical enhancing layers may be deposited on either surface of the glass substrate as desired.

After depositing the first sacrificial layer, a plurality of structure layers will be deposited and patterned as appropriate. According to the invention, a structural layer is a layer that will not be removed after the removal of the sacrificial layers.

Figure 10B:
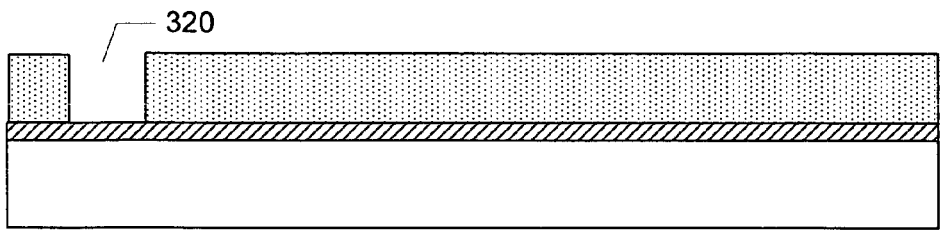
Figure 10C:
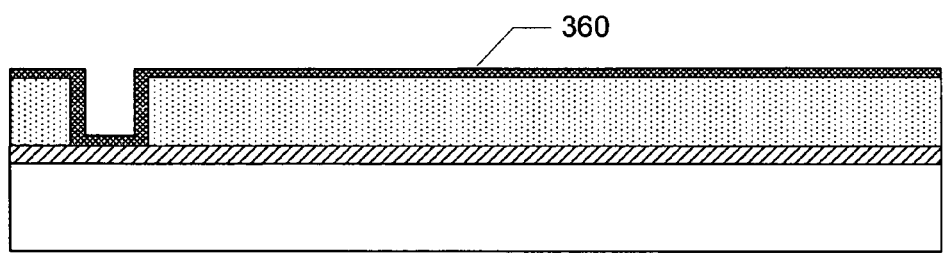

The deposited first sacrificial layer is patterned for forming one deep-via area 320 using standard lithography techniques followed by etching, as shown in FIG. 10B. The etching step may be performed using $Cl_2$, $BCl_3$, or other suitable etchant depending upon the specific material(s) of the second sacrificial layer.

The first structural layer deposited on the first sacrificial layer is hinge layer 360 for forming a hinge structure. Because the hinge provides a rotation axis for the micromirror plate, it is natural to expect that the hinge layer comprises a material that is at least susceptible to plastic deformation (e.g. fatigue, creep, and dislocation motion). Furthermore, when the hinge layer is also used as electric contact for the micromirror plate, it is desired that the material of the hinge layer is electrically conductive. Examples of suitable materials for the hinge layer are silicon nitride, silicon oxide, silicon carbide, polysilicon, Al, Ir, titanium, titanium nitride, titanium oxide(s), titanium carbide, $CoSiN_x$, $TiSiN_x$, $TaSiN_x$, or other ternary and higher compounds. When titanium is selected for the hinge layer, it can be deposited at 100° C. Alternatively, the hinge layer may comprise of multi-layers, as previously explained.

Figure 10D:
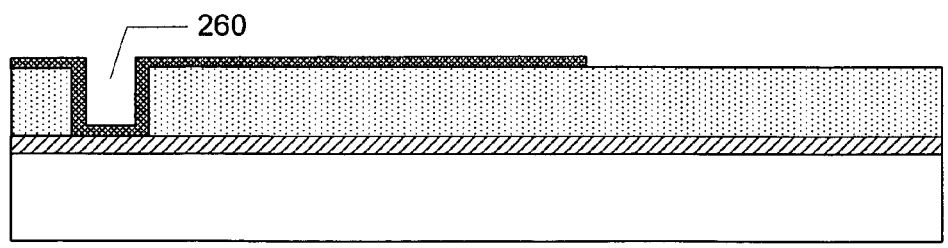

After deposition, the hinge layer is then patterned as desired using etching as shown on FIG. 10D. The hinge layer can be etched with a chlorine chemistry or a fluorine chemistry where the etchant is a perfluorocarbon or hydrofluorocarbon (or $SF_6$) that is energized so as to selectively etch the hinge layers both chemically and physically (e.g. a plasma/RIE etch with $CF_4$, $CHF_3$, $C_3F_8$, $CH_2F_2$, $C_2F_6$, $SF_6$, etc. or more likely combinations of the above or with additional gases, such as $CF_4/H_2$, $SF_6/Cl_2$, or gases using more than one etching species such as $CF_2Cl_2$, all possibly with one or more optional inert diluents). Different etchants may, of course, be employed for etching each hinge layer (e.g. chlorine chemistry for a metal layer, hydrocarbon or fluorocarbon (or $SF_6$) plasma for silicon or silicon compound layers, etc.).

Figure 10E:
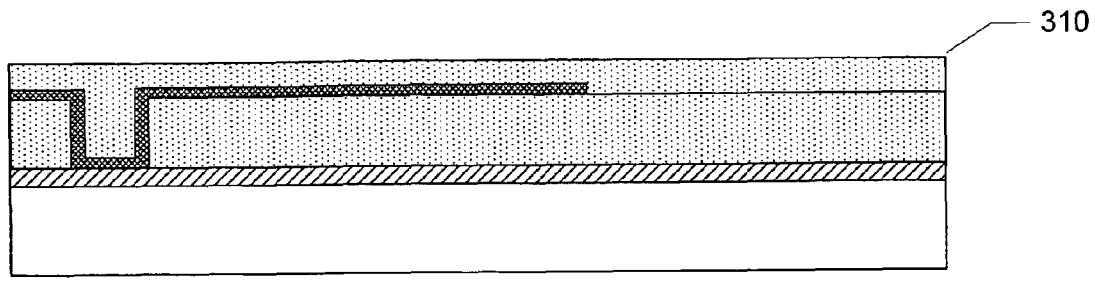

Referring to FIG. 10E, before depositing further structural layers, second sacrificial layer 310 is deposited on top of the hinge structure 360 and first sacrificial layer 290. Second sacrificial layer 310 may comprise amorphous silicon, or could alternatively comprise one or more of the various materials mentioned above in reference to first sacrificial layer 290. First and second sacrificial layers need not be the same, though are the same in the preferred embodiment so that, in the future, the etching process for removing these sacrificial layers can be simplified. Similar to the first sacrificial layer, second sacrificial layer 310 may be deposited using any suitable method, such as LPCVD or PECVD. If the second sacrificial layer comprises amorphous silicon, the layer can be deposited at 350° C. The thickness of the second sacrificial layer can be on the order of 9000 Å, but may be adjusted to any reasonable thickness, such as between 2000 Å and 20,000 Å depending upon the desired distance (in the direction perpendicular to the micromirror plate and the substrate) between the micromirror plate and the hinge. It is preferred that the hinge and mirror plate be separated by a gap after release of at least 0.5 um (this can be at least 1 um or even 2 um or more if desired).

Figure 10F:
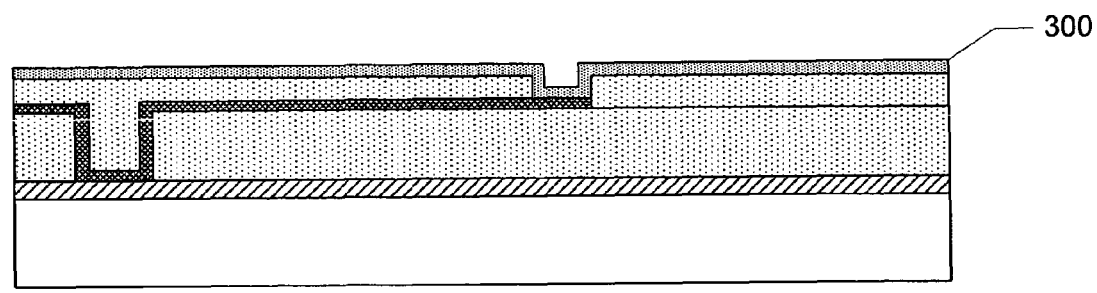

The second sacrificial layer 310 is afterwards patterned for forming shallow-via area 330 using standard lithography techniques followed by etching, as shown in FIG. 10F. The etching step may be performed using $Cl_2$, $BCl_3$, or other suitable etchant depending upon the specific material(s) of the second sacrificial layer. The shallow-via area, which can be of any suitable size, is preferably on the order of 2.2 μm on a side.

The last structural layer deposited on the second sacrificial layer is micromirror plate layer 300 for forming a micromirror. Because the micromirror is designated for reflecting incident light in the spectrum of interest (e.g. visible light spectrum), it is preferred that the micromirror plate layer comprises of one or more materials that exhibit high reflectivity (preferably 90% or higher) to the incident light. According to the embodiment of the invention, micromirror plate layer 300 is a multi-layered structure as shown in FIG. 12. Referring to FIG. 12, hinge plate layer 300 comprises layers 307, 305, 303 and 301. Layers 307 and 301 are protection layers for protecting the interior layers (e.g. layers 303 and 305). In the preferred embodiment of the invention, layers 307 and 301 are $SiO_x$ with a preferred thickness of 400 Å. Of course, other suitable materials may also be employed herein. Layer 305 is a light reflecting layer that comprises one or more materials exhibiting high light reflectivity. Examples of such materials are Al, Ti, AlSiCu or TiAl. In the preferred embodiment of the invention, layer 305 is aluminum with a thickness of 2500 Å. This aluminum layer is preferred to be deposited at 150° C. or other temperatures preferably less than 400° C. Layer 303 is an enhancing layer that comprises of metal or metal alloy for enhancing the electric and mechanical properties of the micromirror plate. An example of such enhancing layer is titanium with a thickness of 80 Å. Of course, other suitable materials having high reflectivity to the incident light of interest may also be adopted for the micromirror plate. In depositing the micromirror plate layer, PVD is preferably used at 150° C. The thickness of the micromirror plate layer can be wide ranging depending upon the desired mechanical (e.g. elastic module), the size of the micromirror, desired titled angle and electronic (e.g. conductivity) properties of the micromirror plate and the properties of the materials selected for forming the micromirror plate. According to the invention, a thickness of from 500 Å to 50,000 Å, preferably around 2500 Å, is preferred.

According to another embodiment of the invention, the light reflecting layer 305 is an electro-conducting layer that comprises a material having a resistivity less than 10,000

μΩ·cm. Layers 301 and 307 are insulators with resistivities greater than 10,000 μΩ·cm. And layer 303 is an electroconducting layer with a resistivity also less than 10,000 μΩ·cm.

Figure 10G:
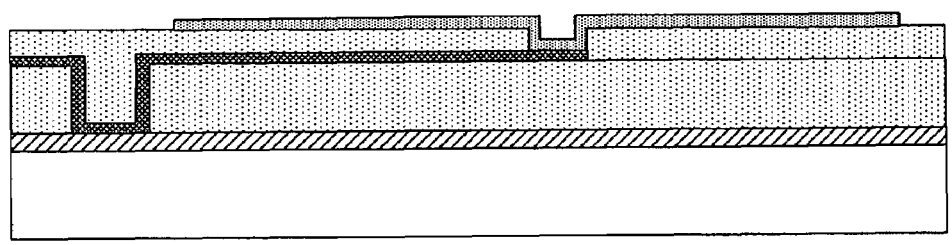

Micromirror plate layer 300 is then patterned into a desired shape, as shown in FIG. 10G. The micromirror can be of any shape as desired. The patterning of the micromirror can be achieved using standard photoresist patterning followed by etching using, for example CF4, Cl2, or other suitable etchant depending upon the specific material of the micromirror plate layer.

Figure 11:
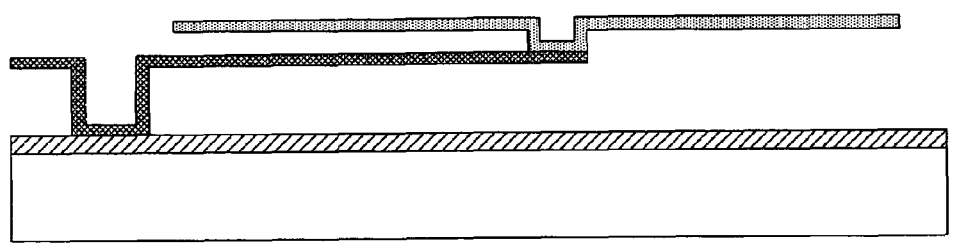
FIG. 11 is a cross-sectional view of micromirror device thus obtained after removing the sacrificial layers according to another embodiment of the invention.

In order to release the micromirror plate for pivoting along the hinge, the sacrificial layers (e.g. layers 290 and 310) are removed by etching as discussed below. A cross-sectional view of the released micromirror device is presented in FIG. 11.

It will be appreciated by those of skill in the art that a new and useful spatial light modulator has been described herein. In view of the many possible embodiments to which the principles of this invention may be applied, however, it should be recognized that the embodiments described herein with respect to the drawing figures are meant to be illustrative only and should not be taken as limiting the scope of invention. For example, those of skill in the art will recognize that the illustrated embodiments can be modified in arrangement and detail without departing from the spirit of the invention. Therefore, the invention as described herein contemplates all such embodiments as may come within the scope of the following claims and equivalents thereof.

We claim:

1. A projection system, comprising:
   an illumination system providing a incident light beam;
   a spatial light modulator having an array of micromirrors, each of which comprises:
      a circuitry substrate;
      at least one hinge post directly attached to the circuitry substrate;
      a deformable hinge disposed on the at least one hinge post; and
      a mirror plate attached to the hinge on a side of the hinge closer to the circuitry substrate such that the mirror plate is operable to rotate on the circuitry substrate;
      wherein the hinge and the mirror plate are formed in separate planes parallel to the circuitry substrate when the mirror plate is not deflected, and wherein the hinge plane is closer to the incident light beam than the mirror plate plane; and
   an optical element for directing the light onto or away from the spatial light modulator.

2. The system of claim 1, wherein the hinge is positioned relative to the mirror plate such that a portion of the mirror plate is shadowed by the hinge under the incident light beam.

3. The system of claim 1, further comprising a second substrate that is transmissive to visible light and disposed closer to the incident light beam than the hinge.

4. The system of claim 3, wherein the second substrate is glass.

5. The system of claim 1, wherein the hinge has a zigzag edge.

6. The system of claim 1, wherein the circuitry substrate comprises a semiconductor substrate that has an array of electrodes and circuitry formed thereon.

7. The system of claim 1, wherein the hinge is a torsion hinge.

8. The system of claim 1, wherein the illumination system comprises:
   a light source providing a light beam for the system;
   a light pipe for conducting the light beam onto the spatial light modulator; and
   a color wheel having a set of color segments.

9. The system of claim 8, wherein the color wheel is positioned between the light source and the light pipe.

10. The system of claim 8, wherein the color wheel is positioned after the light source and the light pipe in a propagation path of the light beams.

11. A projection system, comprising:
    an illumination system providing a light beam;
    a spatial light modulator having an array of micromirrors, each of which comprises:
       a circuitry substrate;
       at least one hinge post directly mounted on the circuitry substrate;
       a deformable hinge disposed on the at least one hinge post; and
       a mirror plate attached to the hinge on a side of mirror plate closer to the circuitry substrate such that the mirror plate is operable to rotate on the circuitry substrate; wherein the hinge and the mirror plate are located such that a portion of the mirror plate is underneath the hinge viewed along a direction of the light beam;
    an optical element; and
    a display target.

12. A projector, comprising:
    a light source for providing a light beam;
    a condensing lens for condensing the light beam from the light source onto a spatial light modulator;
    said spatial light modulator, further comprising:
       a transmissive substrate that is transmissive to visible light;
       a first gap below the transmissive substrate;
       a hinge below the first gap;
       a second gap below the hinge;
       a mirror plate below the second gap and attached to the hinge; and
       a circuit substrate positioned below and spaced apart from the mirror plate; and
       a hinge post disposed below the first gap and on the circuit substrate, and contacting and supporting the hinge;
    a display target; and
    wherein the light beam impinges a surface of the mirror plate through the transmissive substrate on a same side as the hinge.

13. The projector of claim 12, wherein the hinge of the spatial light modulator is connected to the circuit substrate via a plurality of posts extending from a top surface of the circuit substrate.

14. The projector of claim 13, wherein the hinge further comprises a flexible portion that is connected to the posts and which extends across the mirror plate and is connected to the mirror plate.

15. The projector of claim 12, wherein the mirror plate is attached to the hinge with a hinge contact.

16. The projector of claim 12, wherein the mirror plate has first and second portions such that during deflection of the mirror plate, the second portion of the mirror plate moves towards a bottom surface of the transmissive substrate as the first portion moves away from the bottom surface.

17. The projector of claim 16, wherein the second portion of the mirror plate is constructed so as to abut against the transmissive substrate to thereby limit deflection of the mirror plate.

18. The projector of claim 12, wherein said circuit substrate comprises an electrode for creating attraction between the mirror plate and the circuit substrate.

19. The projector of claim 12, wherein the mirror plate includes a conductive layer.

20. The projector of claim 12, wherein the hinge is a torsion hinge.

21. The projector of claim 12, wherein the hinge has a zigzagged edge.

22. A spatial light modulator, comprising:
an optically transmissive substrate;
a semiconductor substrate having thereon a deflectable element; and
the deflectable element comprising
a mirror plate,
a hinge which is disposed on a same side of the mirror plate as the optically transmissive substrate, and
a hinge post disposed below a gap under the transmissive substrate, and on the semiconductor substrate, and contacting and supporting the hinge.

23. The spatial light modulator of claim 22, wherein the hinge comprises a flexible portion that extends across and which is connected to the mirror plate, said flexible portion formed on a same side of the mirror plate as the optically transmissive substrate.

24. The spatial light modulator of claim 22, wherein the hinge has a zigzagged edge.

25. The spatial light modulator of claim 22, wherein the semiconductor substrate has an electrode and circuitry formed thereon.

26. The spatial light modulator of claim 22, wherein the mirror plate further comprises a reflecting layer for reflecting visible light.

27. The spatial light modulator of claim 26, wherein the mirror plate further comprises a conducting layer.

28. A spatial light modulator, comprising:
a circuit substrate having a deflectable element formed thereon, the deflectable element comprising a hinge which is disposed on the opposite side of the deflectable element as the circuit substrate, and comprising at least one hinge post connected to the hinge and directly mounted on the circuit substrate, and supporting the hinge over the circuit substrate.

29. A micromirror device, comprising:
a silicon substrate;
a first gap above the silicon substrate;
a mirror plate above the first gap;
a second gap above the mirror plate;
a hinge above the second gap, wherein the mirror plate is attached to the hinge such that the mirror plate can rotate relative to the silicon substrate; and
a hinge post disposed on the silicon substrate, and extending from the silicon substrate through the first and second gaps, and contacting and supporting the hinge.

30. The device of claim 29, wherein the hinge comprises a flexible portion that extends across the mirror plate, said flexible portion being disposed above the second gap and attached to the mirror plate with a hinge contact.

31. The device of claim 29, wherein the mirror plate includes a reflection layer that reflects visible light.

32. The device of claim 29, wherein the mirror plate includes a conducting layer.

33. The device of claim 29, wherein the silicon substrate further comprises an electrode and circuitry for deflecting the mirror plate.

34. A micromirror device, comprising:
a transmissive substrate that is transmissive to visible light;
a first gap below the transmissive substrate;
a hinge below the first gap;
a second gap below the hinge;
a mirror plate below the second gap, wherein the mirror plate is attached to the hinge such that the mirror plate can rotate relative to the transmissive substrate;
a semiconductor substrate disposed below and spaced apart from the mirror plate; and
one or more hinge posts disposed between and contacting the semiconductor substrate and the hinge.

35. The device of claim 34, wherein the semiconductor substrate has circuitry formed thereon, and wherein the circuitry is disposed below the mirror plate for deflecting the mirror plate.

36. The device of claim 34, wherein the mirror plate further comprises a reflecting layer for reflecting visible light.

37. The device of claim 36, wherein the mirror plate further comprises a conducting layer.

38. A method of making a projector, comprising:
providing a light source, a collection lens, a projection lens and a display target;
providing a spatial light modulator, wherein the spatial light modulator comprises:
a transmissive substrate that is transmissive to visible light;
a first gap below the transmissive substrate;
a hinge below the first gap;
a second gap below the hinge;
a mirror plate below the second gap;
a semiconductor substrate disposed below and spaced apart from the mirror plate; and
one or more hinge posts disposed between and contacting the semiconductor substrate and the hinge; and
arranging the spatial light modulator, the collection lens, the light source, the projection lens and the display target such that, a light beam from the light source is focused by the collection lens onto the mirror plate through the transmissive substrate, and reflected by the mirror plate, the reflected light being collected by the projection lens and projected onto the display target.

* * * * *